Feb. 1, 1949.　　　　R. R. MILLAR　　　　2,460,648
UNIVERSAL JOINT FOR MILL DRIVES
Filed Sept. 29, 1944　　　　2 Sheets-Sheet 1
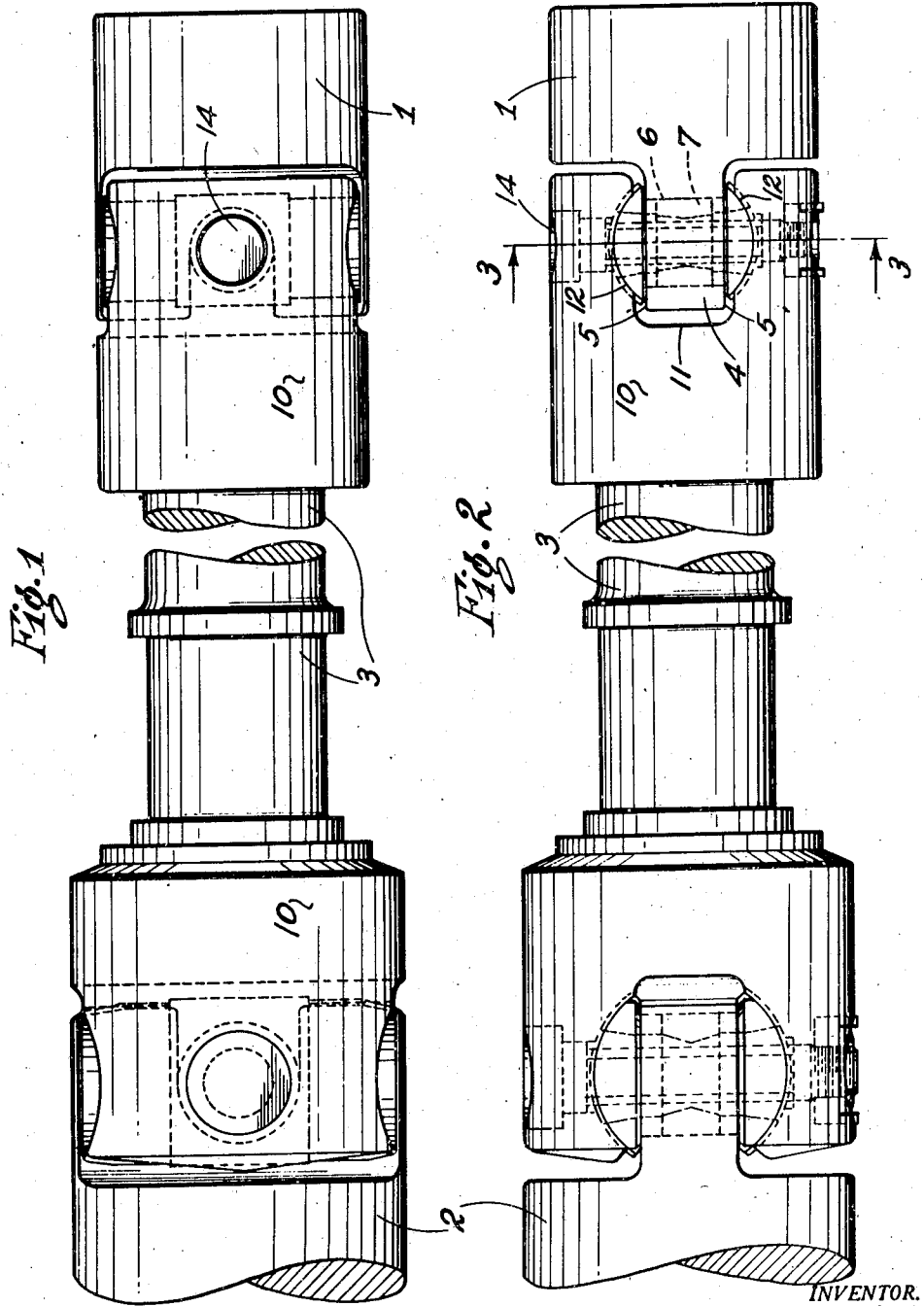
INVENTOR.
ROLAND R. MILLAR
BY
ATTORNEYS Feb. 1, 1949.  R. R. MILLAR  2,460,648
UNIVERSAL JOINT FOR MILL DRIVES
Filed Sept. 29, 1944  2 Sheets-Sheet 2
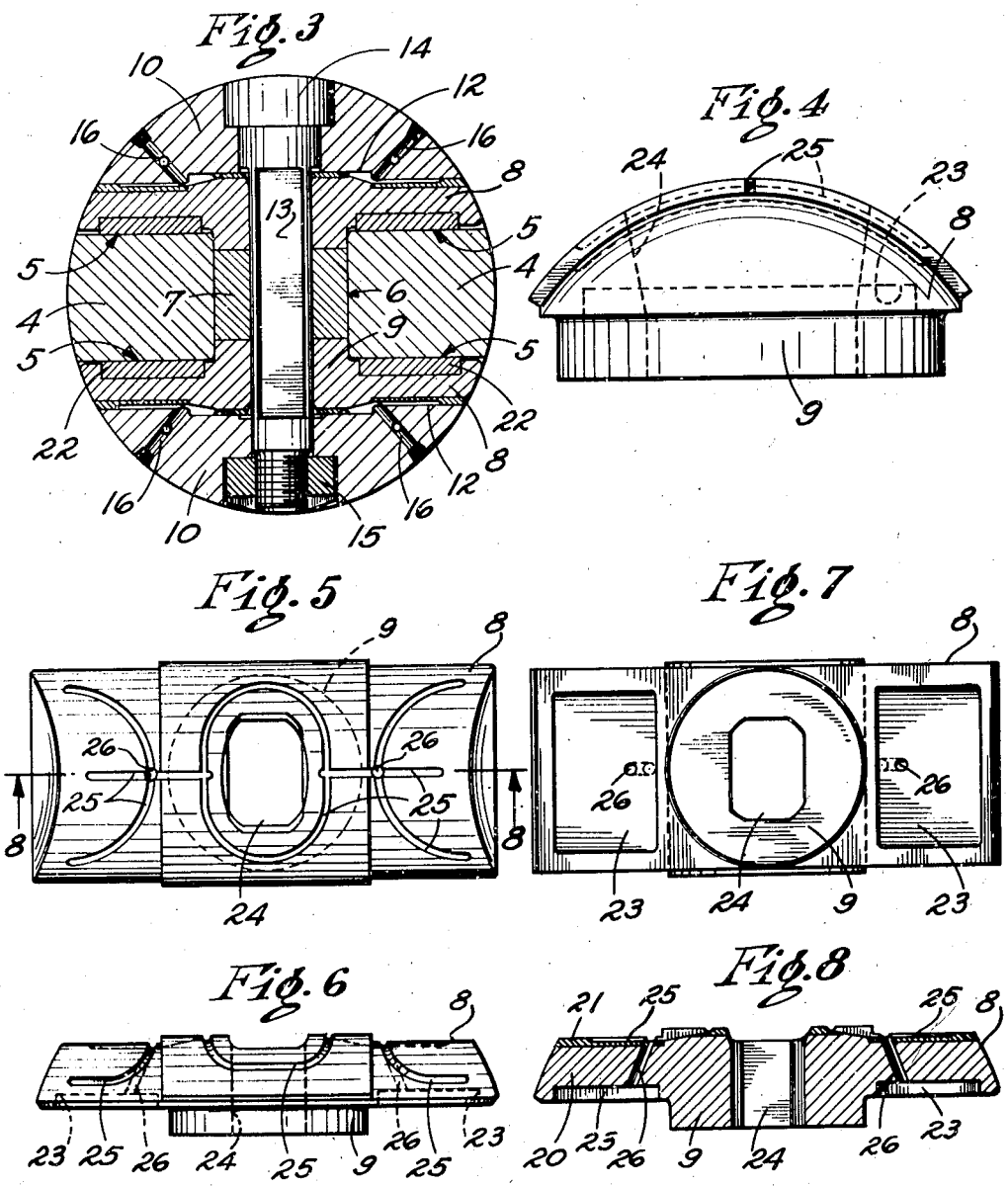
INVENTOR.
ROLAND R. MILLAR
BY
Richey Watts
ATTORNEYS Patented Feb. 1, 1949

2,460,648

UNITED STATES PATENT OFFICE 2,460,648

UNIVERSAL JOINT FOR MILL DRIVES

Roland R. Millar, Massillon, Ohio, assignor to Republic Steel Corporation, Cleveland, Ohio, a corporation of New Jersey Application September 29, 1944, Serial No. 556,340

6 Claims. (Cl. 64—7)

This invention relates generally to flexible or universal couplings and particularly to such couplings for connecting a driving shaft with a driven shaft, or a roll, of a rolling mill stand.

For many years flexible or universal couplings have been employed to connect the rolls of rolling mill stands with driving shafts. These couplings have included members, such as variously shaped shoes, thru which the forces exerted by the driving shaft were transmitted to the driven shaft. Since the coupling was of the universal or flexible type a certain amount of relative movement of the parts thereof was essential and clearances between the parts were required. Altho lubricant was used in the couplings the initial clearances were rapidly increased and, while part of these increases could be compensated for by insertion of shims, the clearances soon became too large even for shims and the shoe members had to be replaced or repaired at considerable expense.

Various expedients have been proposed heretofore for prolonging the life of the shoe members of couplings for rolling mills, but, so far as I know, none of those proposals was satisfactory.

I have discovered that the cause of the short life of the shoes of such couplings is largely traceable to the impact forces which are delivered to them when the driving shaft is started, stopped or reversed. The driving shaft transmits rotary motion to the shoes and driven shaft and during the transmission of such rotating forces the driving shaft, the shoes and the driven shaft portion of the coupling are in driving contact with each other, ignoring for the moment the existence of a film of lubricant between the metal surfaces of these parts. During such rotational movement the shoes are not worn rapidly or cold worked or deformed. However, when the driving shaft is started, stopped or reversed it delivers impact forces to the shoes which are quite large and are sufficient to cold work and deform the metal of the shoes. I believe that the initial necessary clearances in the coupling between the shoes and tongues are sufficient for the initiation of such cold working and deformation of the shoes and as these clearances increase the rate and extent of cold working and deformation of the shoes also increase.

The present invention is based on that discovery and aims to provide a coupling in which the impact forces incident to starting, stopping and reversing the driving shaft will be substantially or largely absorbed in such a manner that cold working and deformation of the shoes will be reduced or avoided and as a result the service life of those shoes will be greatly extended.

In the drawings accompanying and forming a part of this specification,

Figure 1 is a top plan view of couplings embodying the present invention and connecting a driving shaft thru a spindle to a roll of a rolling mill stand;

Figure 2 is a side elevational view of the apparatus of Fig. 1;

Figure 3 is a cross-sectional view taken on line 3—3 of Fig. 3;

Figure 4 is an end elevational view of one of the two similar shoes of Figs. 1, 2 and 3;

Figures 5, 6 and 7 are, respectively, top plan, side elevational, and bottom plan views of the shoe of Fig. 4; and, Figure 8 is a longitudinal, cross-sectional view taken on line 8—8 of Fig. 5.

In Figs. 1 and 2 one end of drive shaft 1 is connected to an end of roll 2 through spindle 3 by flexible couplings at the ends of spindle 3, these couplings being shown in greater detail in Figs. 3 to 8. Since the couplings are alike, only one will be described.

Driving shaft 1 is substantially cylindrical and has an end projection or tongue 4 defined in part by parallel chordal plane surfaces 5. The tongue 4 is notched as at 6 and filler block 7 is positioned therein to act as a spaced for shoes 8 which are located on opposite sides of tongue 4 and which have boss-like extensions 9 extending into notch 6 and bearing against block 7.

Spindle 3 has a head 10 adjacent to shaft 1 which is recessed as at 11 to receive tongue 4 of shaft 1. Opposite walls of recess 11 have surfaces 12 which are fragments of cylindrical surfaces and which are shaped to conform to the outer surfaces of shoes 8. A bolt 13 extends through head 10, shoes 8 and filler block 7 with its head 14 and nut 15 seating on shoulders in the head 10 so that the several parts of the coupling may be held in assembled position with the desired clearances between tongue 4, head 10 and shoes 8. Passages 16 extend from the outer surface of head 10 into recesses 11 so that lubricant may be supplied to the outer faces of the shoes 8.

Shoes 8 are substantially alike. Each shoe 8 is substantially a segment of a cylinder with a boss-like extension 9 extending from the chordal side thereof. Each shoe comprises a body 20, a bearing 21 and impact absorbers 22. Body 20 is preferably a steel forging, has recesses 23 in its chordal or plane surface to receive members 22, has an arcuate outer surface to engage member 21 and has a hole 24 therethrough for bolt 13. This hole is flared outwardly as shown in Figs. 4, 5 and 7 to permit sidewise movement of the shoe relative to bolt 13.

Bearing 21 is preferably composed of antifriction or bearing metal, for example, brass, is curved to conform to the arcuate surface of body 20, has an outer surface conforming to surface 12 of recess 11, and is affixed to body 20 in any suitable manner, for example, by being brazed thereto. Its outer surface has oil grooves 25 which communicate with passages 26 leading through body 20 into recesses 23. Lubricant supplied through passage 15 may thus pass into recesses 23.

The impact absorbers 22 are preferably composed of material which is capable of resisting wear and compression and of absorbing and distributing impact forces.

I have had good success with impact absorbers which comprised woven fabric impregated with heat hardened resinous material and which had been molded to the desired size and shape under heat and pressure. Such absorbers were dense, substantially non-compressible, resistant to surface wear when the tongue engaging surfaces were lubricated, tough due to the fibrous content, and sufficiently strong due to surrounding supporting walls to withstand heavy impact forces without shattering, and sufficiently hard to resist deformation under impact forces but is softer than the metal of the drive shaft tongues.

Generally speaking, any composition which comprises fibrous material and a heat hardenable impregnating material and which could be used as mill bearings may be used as impact absorbers of this invention.

The impact absorbers 22 are pressed into recesses 23 and project beyond the chordal surface of body 20 and engage the opposed chordal surface of tongue 4, and are provided with one or more holes therethru (not shown) for the passage of lubricant from passages 26 to the tongue engaging surfaces of absorbers 26. Members 22 may be readily removed from their shoes and replaced by corresponding members whenever they become damaged or worn to such an extent that undesired looseness in the coupling is thereby created.

When the parts of a coupling of this invention, such as shown in the drawings, are assembled the outer arcuate surfaces of the shoes have a bearing fit with the inner surfaces of head 10, that is these surfaces are separated by small spaces filled with lubricant; the chordal surfaces of the shoes are spaced some distance from the opposed surfaces of the tongues; and the impact absorbers extend across the spaces between the shoes and tongues and contact with the tongues.

When the drive spindle is actuated it delivers impact forces to the motionless impact absorbers. Those absorbers absorb some part of such forces and distribute other parts to the shoes. Forces so received by the shoes are distributed thruout the shoes and are transmitted thru the lubricant to the head of the coupling with resultant rotational actuation of the head. A similar, tho smaller and reverse action takes place when the drive shaft is stopped. Since the impact absorbers can not cold work or deform the surrounding metal of the shoes and since the tongues do not come into contact with the shoes, the shoes are not cold worked or deformed and therefore have greatly lengthened service lives.

When the impact absorbers become worn under repeated hammerings to which they are subjected, they may be replaced but such replacement is quite inexpensive as compared with the time, material and labor costs of replacing the shoes.

Shoes composed of materials other than those described hereinabove may be used in practicing the present invention. For example, the shoes may consist of single pieces of suitable copper containing bearing compositions such as brass or bronze instead of the composite steel body 20 and bearing 21 of Figs. 5 to 8. The impact absorbers will protect the brass or bronze shoes against cold working and deformation in the same way as has been described above in connection with the forged steel body 20.

It will be understood from what has been said hereinabove that couplings embodying the present invention include a means for connecting together the ends of two shafts or spindles and absorbing and distributing impact forces for a long period of time without substantial cold working or deformation of the shoes, that the shoes may be lubricated at all times and that the inexpensive impact absorbers may be readily removed for replacement when necessary.

Couplings embodying this invention have greatly prolonged service lives and very low maintenance costs as contrasted with the prior couplings with which I am familiar.

Having thus described my invention so that others skilled in the art may be able to understand and practice the same, I state that what I desire to secure by Letters Patent is defined in what is claimed.

What is claimed is:

1. A flexible coupling for two shafts, comprising a tongue attached to one shaft, a body attached to the second shaft and having a recess defined in part by opposed curved surfaces to receive said tongue, and means for connecting said tongue and body, said means comprising bearing metal shoes disposed in the curved recesses of the body and provided with recesses open to said tongue and impact absorbing and distributing members filling and fixed against movement in said recesses in said shoes and engaging said tongue, said members comprising fibrous material and heat hardenable material.

2. A flexible coupling for two shafts, comprising a tongue at one end of one shaft defined in part by opposed plane surfaces, a body at one end of the other shaft and having a tongue receiving recess defined in part by partially cylindrical surfaces opposed to said plane surfaces, and means for connecting said tongue and body, said means comprising bearing metal shoes which are cylindrical segments and which are disposed in said body with their chordal surfaces adjacent to the plane surfaces of said tongue and their curved surfaces having bearing clearances with the partially cylindrical surfaces of said body said plane surfaces having recesses, and impact absorbing and distributing members filling and fixed against movement in said recesses in said shoes, engaging said tongue and normally preventing actual contact of the shoes and tongue, said members comprising molded bodies of fibrous and heat hardenable resinous materials.

3. A flexible coupling for two shafts comprising a tongue at the end of one shaft, a body at the end of the other shaft having a recess defined in part by curved surfaces to receive said tongue, and means for connecting said tongue and said body including shoes disposed therebetween, each said shoe comprising a metal member having a curved, metal bearing surface having bearing clearance with the adjacent curved surface of the body and a recessed surface opposed to said tongue, and molded, fibrous impact absorbing and distributing members having a pressed fit in said recesses and engaging the tongue and spacing the shoe apart from the tongue.

4. A flexible coupling for two shafts comprising a tongue at the end of one shaft, a body at the end of the other shaft having a recess defined in part by curved surfaces to receive said tongue, and means for connecting said tongue and said body including shoese disposed therebetween each said shoe comprising a forged steel member having a recessed surface, bearing metal secured to the opposed surface thereto and having an outer surface shaped to have bearing clearance with the adjacent curved surface of said body, and fibrous, impact absorbing and distributing members engaging the said tongue and spacing the shoe apart from said tongue, said members being resistant to shattering and deformation under impact but softer than said tongues.

5. A flexible coupling for two shafts comprising a tongue at the end of one shaft, a body at the end of the other shaft having a recess defined in part by curved surfaces to receive said tongue, and means for connecting said tongue and said body including shoes disposed therebetween, each said shoe comprising a single piece of copper containing bearing metal whose outer surface is curved and has bearing clearance with the adjacent curved surface of said body and whose opposed surface is recessed and fibrous, impact absorbing and distributing members secured in said recesses and engaging the tongue and spacing the shoe apart from said tongue, said members being resistant to shattering and deformation by impact but softer than said tongue.

6. A flexible coupling for two shafts comprising a tongue at the end of one shaft, a body at the end of the other shaft having a recess defined in part by curved surfaces to receive said tongue, and means for connecting said tongue and said body including shoes disposed therebetween, each said shoe comprising a metal member having a curved, metal bearing surface having bearing clearance with the adjacent curved surface of the body and carrying impact absorbing and distributing members engaging the tongue and spacing the shoe apart from the tongue, said impact absorbing and distributing members comprising fibrous material impregnated with heat hardened resinous material.

ROLAND R. MILLAR.

REFERENCES CITED

The following references are of record in the file of this patent:

UNITED STATES PATENTS

| Number | Name | Date |
| --- | --- | --- |
| 905,355 | Peckham | Dec. 1, 1908 |
| 1,115,433 | Hunt | Oct. 27, 1914 |
| 2,305,073 | Gatke | Dec. 15, 1942 |
| 2,361,629 | Irvin | Oct. 31, 1944 |